US012611360B2

(12) United States Patent
Zhang et al.

(10) Patent No.: US 12,611,360 B2
(45) Date of Patent: Apr. 28, 2026

(54) MASSAGER

(71) Applicant: SICHUAN QIANLI-BEOKA MEDICAL TECHNOLOGY INC., Sichuan (CN)

(72) Inventors: Wen Zhang, Sichuan (CN); Xiaolang Deng, Sichuan (CN); Xiaozhou Zhang, Sichuan (CN); Jianghai Xiao, Sichuan (CN); Hailin Tang, Sichuan (CN); Zhijun Li, Sichuan (CN)

(73) Assignee: SICHUAN QIANLI-BEOKA MEDICAL TECHNOLOGY INC., Chengdu (CN)

( * ) Notice: Subject to any disclaimer, the term of this patent is extended or adjusted under 35 U.S.C. 154(b) by 5 days.

(21) Appl. No.: 18/933,401

(22) Filed: Oct. 31, 2024

(65) Prior Publication Data

US 2026/0000574 A1 Jan. 1, 2026

(30) Foreign Application Priority Data

Jun. 28, 2024 (CN) ......................... 202421512518.9
Jun. 28, 2024 (CN) ......................... 202421512523.X

(51) Int. Cl.
*A61H 23/00* (2006.01)
*A61H 23/02* (2006.01)

(52) U.S. Cl.
CPC ....... *A61H 23/006* (2013.01); *A61H 23/0218* (2013.01); *A61H 2201/0107* (2013.01); *A61H 2201/0153* (2013.01); *A61H 2201/1664* (2013.01); *A61H 2201/5058* (2013.01)

(58) Field of Classification Search
CPC ...... A61H 23/006; A61H 1/006; A61H 1/008; A61H 23/0218; A61H 2201/0107; A61H 2201/0153; A61H 2201/1664; A61H 2201/5058
USPC .................................................. 601/107–108
See application file for complete search history.

(56) References Cited

U.S. PATENT DOCUMENTS

| | | | |
|---|---|---|---|
| 6,682,496 | B1 | 1/2004 | Pivaroff |
| 11,567,007 | B2 | 1/2023 | Siew et al. |
| 11,857,482 | B1 | 1/2024 | Danby et al. |
| 11,938,082 | B1 | 3/2024 | Danby et al. |

(Continued)

FOREIGN PATENT DOCUMENTS

CN 118121474 A * 6/2024 ............ A61H 23/02

OTHER PUBLICATIONS

Translation of CN 118121474. (Year: 2024).*

*Primary Examiner* — Paige Kathleen Bugg
(74) *Attorney, Agent, or Firm* — AVEK IP, LLC

(57) ABSTRACT

A massager is provided in the present disclosure. The massager includes a housing, a piston, a driving mechanism, and a connecting module. The piston is at least partially located in the housing and defines an accommodating hole. The driving mechanism is connected to the piston and configured to cause the piston to reciprocate. The connecting module includes a massaging head. The massaging head is inserted into the accommodating hole. The connecting module is configured to restrain the massaging head from moving out of the accommodating hole and separating from the piston while the piston reciprocates at a speed higher than a predetermined speed. In this way, the problem that the massaging head 10 of the massager is currently prone to fall off during the high-frequency reciprocating motion can be solved.

12 Claims, 18 Drawing Sheets

(56) References Cited

U.S. PATENT DOCUMENTS

| | | | | |
|---|---|---|---|---|
| 12,161,599 | B1* | 12/2024 | Zhou | A61H 23/0263 |
| 2007/0150004 | A1 | 6/2007 | Colloca et al. | |
| 2015/0164738 | A1* | 6/2015 | Caropelo | A61H 19/30<br>601/46 |
| 2015/0305969 | A1* | 10/2015 | Giraud | A61H 7/005<br>601/84 |
| 2019/0350793 | A1* | 11/2019 | Wersland | A61H 23/006 |
| 2022/0296463 | A1* | 9/2022 | Wersland | A61H 23/006 |
| 2023/0172804 | A1* | 6/2023 | Gasner | A61H 23/0254<br>15/22.1 |
| 2023/0181417 | A1* | 6/2023 | Williams | A61H 23/02<br>601/107 |

* cited by examiner

MASSAGER

CROSS-REFERENCE TO RELATED APPLICATIONS

The present application claims priorities to Chinese patent application No. 202421512518.9, filed Jun. 28, 2024, and Chinese patent application No. 202421512523.X, filed Jun. 28, 2024, the disclosures of which are incorporated herein by reference in their entirety.

FIELD

The present disclosure relates to the field of a massager technology.

BACKGROUND

A massager, also known as a massaging gun or vibration gun, is a high-frequency vibrating massager commonly used for muscle recovery and relief of muscle pain. The principle of operation of the massager is to transmit energy to the muscles and fascial tissues through high-speed vibration and impact, promoting blood circulation, and alleviating muscle tension and pain. The massager typically consists of a handheld device and several massaging heads of different shapes and hardness. Users can select an appropriate massaging head to massage based on different body areas and muscles. During use, users simply aim the massaging head at an area to be relaxed and activate the device to help loosen tight muscles and fascia through vibrations of the massager.

In the related art, the massaging heads are generally inserted into a piston disposed in a massager body through a fit of a plug rod and a hole, inserting the massaging head into the piston, and then friction between the massaging head and the piston is increased by a silicone ring such that the massaging head is fixedly connected to the piston. However, the above connecting mechanism, which only relies on the silicone ring to achieve the fixation, is prone to loosen during high-frequency reciprocating motion of the massaging head, especially when the silicone ring ages after a long period of use.

In an invention disclosed in patent application number U.S. Pat. No. 11,567,007 and publication number US20070150004A1, a chiropractic adjusting instrument is disclosed, including a housing, a thrust nose piece, an impact head, a preload switch plunger, a dampening spring, a solenoid with a core, a preload spring, a recoil spring, and an electronic pulse system. However, the chiropractic adjusting instrument still relies only on the silicone ring for fixation, and thus also suffers the issue of the massaging head being prone to fall off during the high-frequency reciprocating motion of the massaging head.

SUMMARY

A massager is provided in the present disclosure. The massager includes a housing, a piston, a driving mechanism, and a connecting module. The piston is at least partially located in the housing and defines an accommodating hole. The driving mechanism is connected to the piston and configured to cause the piston to reciprocate. The connecting module includes a massaging head. The massaging head is inserted into the accommodating hole. The connecting module is configured to restrain the massaging head from moving out of the accommodating hole and separating from the piston while the piston reciprocates at a speed higher than a predetermined speed.

In some embodiments, the predetermined speed corresponds to a stopped state of the piston.

In some embodiments, the massager further includes a controller. The controller is connected with the driving mechanism and configured to activate or shut down the driving mechanism.

In some embodiments, the massaging head includes a massaging portion and a connecting member connected with the massaging portion. The connecting member is arranged with a first connecting portion. The piston is arranged with a second connecting portion matched with the first connecting portion. The connecting module is configured to restrain the massaging head from separating from the piston by inserting the connecting member into the accommodating hole and mating the first connecting portion with the second connecting portion.

In some embodiments, the first connecting portion is in a thread connection with the second connecting portion.

In some embodiments, the first connecting portion is at least one positioning pin arranged on the connecting member in a circumferential direction of the connecting member. The second connecting portion is a rotating snap slot formed in the piston and matched with the at least one positioning pin. The rotating snap slot includes an entry end and a limiting end. While the connecting member inserts into the accommodating hole and rotates in a first direction, the at least one positioning pin rotates from the entry end to the limiting end to restrain the massaging head from separating from the piston.

In some embodiments, an annular elastic member sleeves a periphery of the connecting member. When the first connecting portion is mated with the second connecting portion, the annular elastic member is in a damping connection with the piston.

In some embodiments, the annular elastic element is a silicone fixing ring. An end of the connecting member proximate to the massaging portion defines an annular fixing slot. The silicone fixing ring is arranged in the annular fixing slot. The silicone fixing ring includes an inserting segment and a limiting ring. When the first connecting portion is mated with the second connecting portion, an end of the piston abuts against the limiting ring, and the inserting segment is in a damping connection with an inner side wall corresponding to the accommodating hole.

In some embodiments, the annular elastic element is a silicone snap ring arranged at an end of the connecting member connected with the massaging portion. When the first connecting portion is mated with the second connecting portion, an end of the silicone snap ring inserted into the accommodating hole is in interference fit with the piston.

In some embodiments, the first connecting portion is arranged protruding from the silicone snap ring.

In some embodiments, the massager further includes a sensor disposed on the connecting member or the piston. When the first connecting portion is mated with the second connecting portion, the sensor is triggered.

In some embodiments, the sensor is a tact switch disposed at an end portion of the connecting member inserted into the accommodating hole. When the first connecting portion is mated with the second connecting portion, the tact switch is triggered.

In some embodiments, the sensor is a tact switch disposed at an inner bottom wall corresponding to the accommodating hole. When the first connecting portion is mated with the second connecting portion, the tact switch is triggered.

In some embodiments, an end portion of the connecting member inserted into the accommodating hole is arranged with a boss. The boss is eccentrically arranged relative to an axis of the connecting member. The sensor is a tact switch located at an inner bottom wall corresponding to the accommodating hole. When the first connecting portion is mated with the second connecting portion, the boss is in contact with the tact switch.

In some embodiments, the massager further includes a sensing module. The sensing module is arranged on at least one of the connecting member and the piston and configured to detect a relative position between the connecting member and the piston.

In some embodiments, the massager includes a massager body arranged at an exterior of the connecting member. The sensing module includes a magnetic member and a magnetic sensor. The magnetic member is located at an end portion of the connecting member inserted into the accommodating hole. The magnetic sensor is located on a side wall of the massager body or a side wall of the piston.

In some embodiments, the magnetic member is eccentrically arranged relative to an axis of the connecting member.

In some embodiments, the connecting member defines an induction slot. The magnetic member is located in the induction slot.

In some embodiments, the magnetic member is a magnet or a magnetized portion of the connecting member.

Another massager is provided in the present disclosure. The massager includes a housing, a massaging head, a piston, a driving mechanism, and a controller. The massaging head includes a first connecting portion. The piston is at least partly located in the housing, defines an accommodating hole, and is arranged with a second connecting portion matched with the first connecting portion. The driving mechanism is located in the housing, connected to the piston, and configured to cause the piston to reciprocate in an activation state. The controller is connected to the driving mechanism, and configured to activate the driving mechanism when the massaging head is inserted into the accommodating hole and connected to the piston via the first connecting member and the second connecting member, and to shut down the driving mechanism when the massaging head moves out of the accommodating hole and separates from the piston.

DETAILED DESCRIPTION

Embodiments of the present disclosure are described in detail below with reference to the accompanying drawings.

In the embodiments of the present disclosure, a massager is provided. The massager includes a massaging head connecting assembly.

Figure 1:
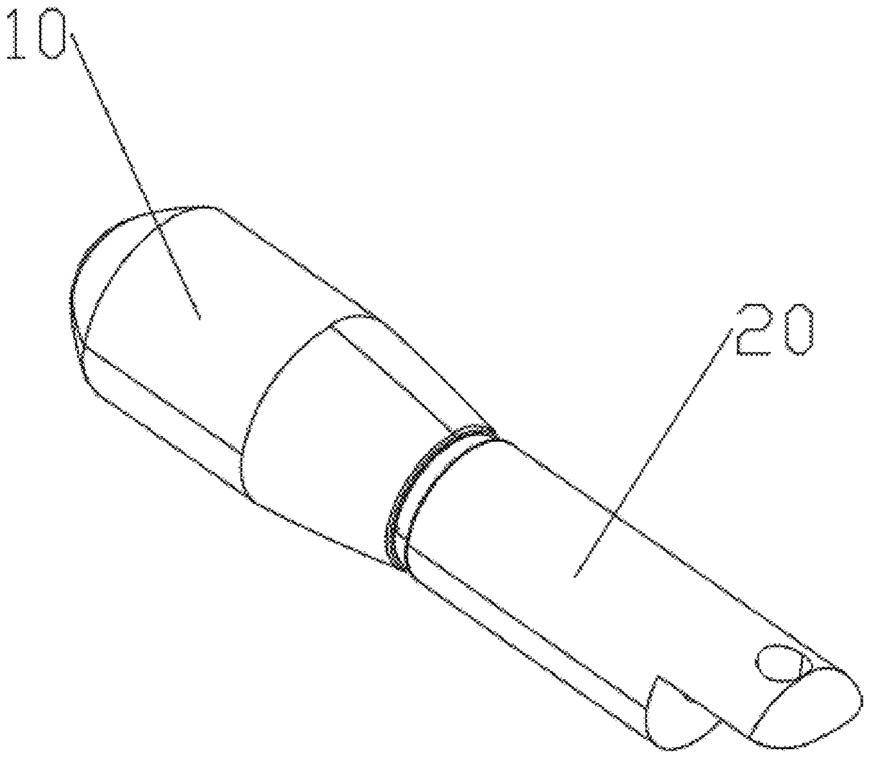
FIG. 1 is a first schematic view of a partial structure of a massager according to an embodiment of the present disclosure.
Figure 2:
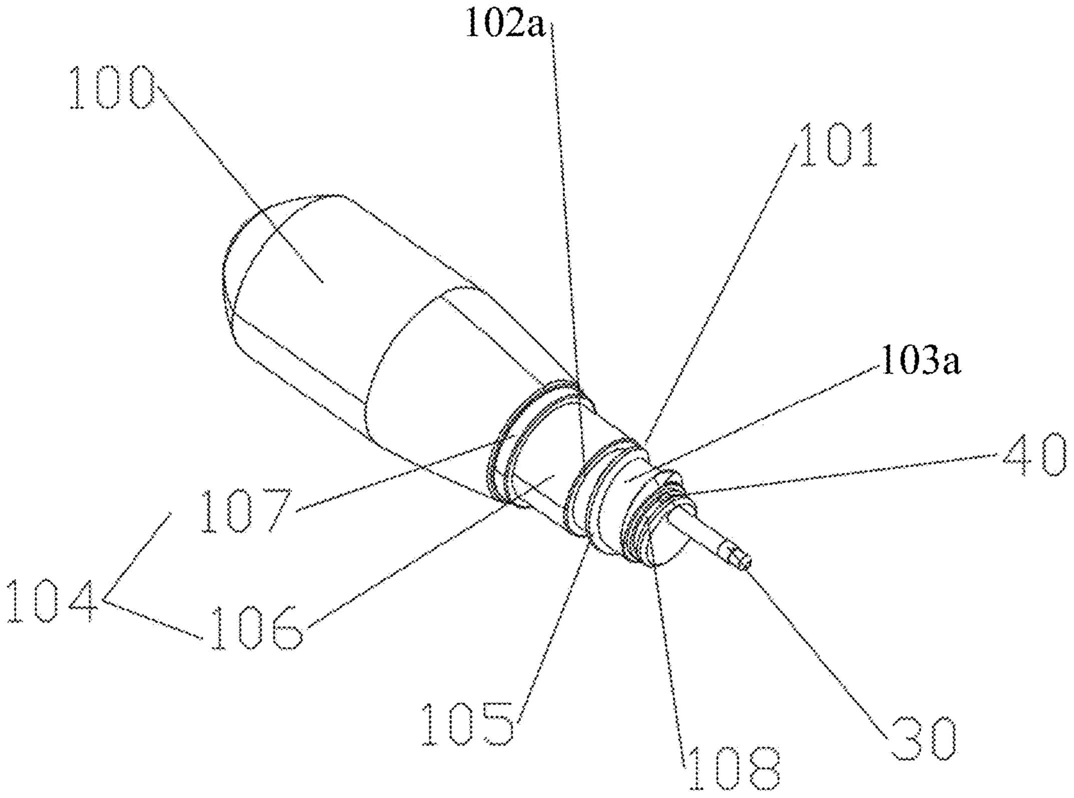
FIG. 2 is a first structural view of a massaging head according to an embodiment of the present disclosure.
Figure 3:
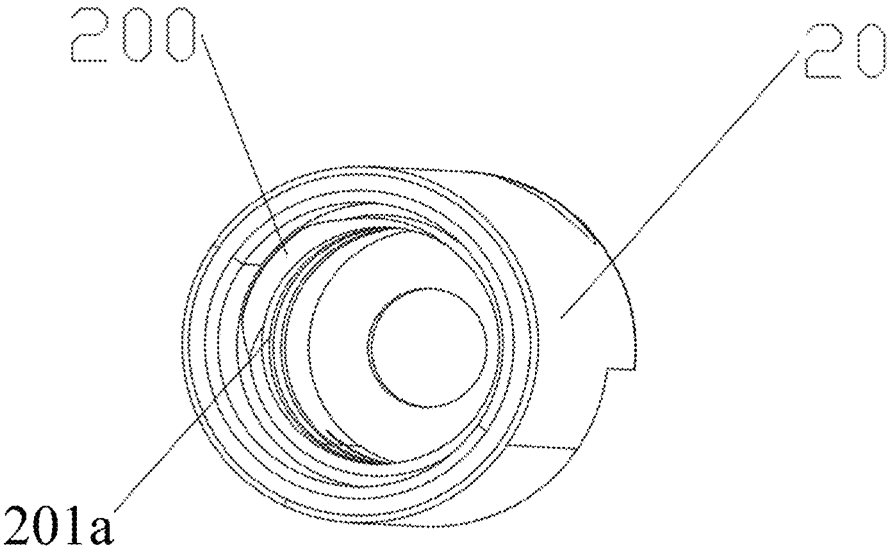
FIG. 3 is a first structural view of a piston according to an embodiment of the present disclosure.

As shown in FIGS. 1-3, in some embodiments, the massaging head connecting assembly is a threaded massaging head connecting assembly. This threaded massaging head connecting assembly includes a massaging head 10 and a piston 20. The massaging head 10 includes a massaging portion 100 and a connecting member 101. The connecting member 101 is connected to the massaging portion 100. The connecting member 101 defines an annular fixing slot 102*a* and arranged with a screwing portion 103*a*. The annular fixing slot 102*a* is located at an end of the connecting member 101 proximate to the massaging portion 100. A silicone fixing ring 104 is disposed in the annular fixing slot [102] 102*a*. The screwing portion [103] 103*a* is arranged with external threads 105 extending outwardly.

The piston 20 has an accommodating hole 200. An inner side wall corresponding to the accommodating hole 200 is arranged with internal threads 201*a* matched with the external threads 105.

The silicone fixing ring 104 includes an inserting segment 106 and a limiting ring 107. When the connecting member 101 is screwed tightly via a thread fit of the external threads 105 and the internal threads 201*a*, an end of the piston 20 abuts against the limiting ring 107, and the inserting segment 106 is in a damping connection with the inner side wall corresponding to the accommodating hole 200.

Compared to conventional massaging head connecting assemblies, in this embodiment, the external threads 105 are arranged on the connecting member 101, the internal threads

201*a* are arranged on the inner side wall corresponding to the accommodating hole 200, and the external threads 105 and internal threads 201*a* mate with each other and form a thread connection, thus fixation of the massaging head 10 and the piston 20 is achieved. In this way, when connecting the massaging head 10 with the piston 20, the massaging head 10 needs to be rotated, and the massaging head 10 can be secured to the piston 20 via the thread connection.

To further address the potential loosening issue that may arise from the thread connection during high-frequency vibration, the silicone fixing ring 104 is arranged to increase friction between the connecting member 101 and the inner side wall corresponding to the accommodating hole 200 when the connecting member 101 is connected to the inner side wall corresponding to the accommodating hole 200. Once the connecting member 101 and the inner side wall corresponding to the accommodating hole 200 are threaded together, the end of the piston 20 presses against the limiting ring 107 of the silicone fixing ring 104, thus achieving vibration reduction. Additionally, the damping connection between the inserting segment 106 of the silicone fixing ring 104 and the inner side wall corresponding to the accommodating hole 200 serves to secure the thread connection, thereby preventing the thread connection from loosening during high-frequency reciprocating motion.

By means of the above manner, the problem of the massaging head 10 easily falling off during the high-frequency reciprocating motion in current massagers can be solved.

Moreover, considering the possibility that users may install or remove the massaging head 10 during the reciprocating motion of the piston 20, in the above embodiments, the thread fit is adopted. In this way, rotating the massaging head 10 multiple turns is required to achieve the installation or removal of the massaging head 10. Thus, the installation of the massaging head 10 can be performed only when the piston 20 is stationary, thereby providing protection for users.

In addition, since the massaging head 10 can be secured only when the massaging head 10 is rotated several turns when mounted on the piston 20, and this operation can only be carried out when the piston 20 is in a stopped state. Similarly, when in a running state, the massaging head 10 also needs to be rotated several turns for disassembly, and this operation can only be carried out when piston 20 is in the stopped state. Thus, by means of the rotation manner, it is ensured that the user can only operate when the piston 20 is not in motion, playing a protective role for the user.

In order to facilitate the user to install the massaging head 10, in some embodiments, a number of the external threads 105 on the connecting member 101 is 2-4 turns. A depth of the massaging head 10 needs to ensure a stable connection between the massaging head 10 and the piston 20.

In order to facilitate the installation of some massaging heads 10 that require a specific installation angle while being installed, such as U-shaped massaging heads 10, a number of the internal threads 201*a* arranged on the inner side wall corresponding to the accommodating hole 200 is one turn more than a number of the external threads 105 on the connecting member 101, and is 3-5 turns. In this manner, these special massaging heads 10 can be adjusted to the specific installation angle.

Figure 10:
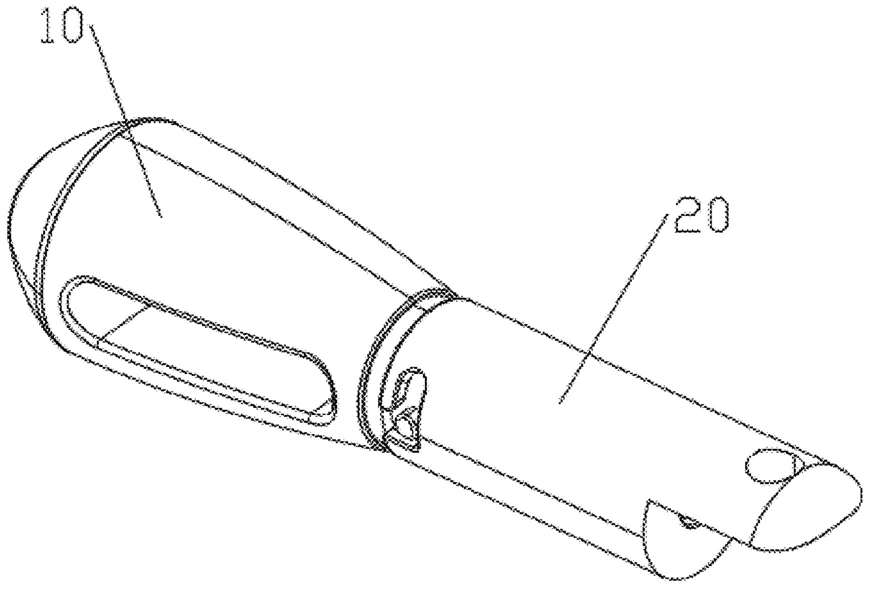
FIG. 10 is a second schematic view of the partial structure of the massager according to an embodiment of the present disclosure.
Figure 11:
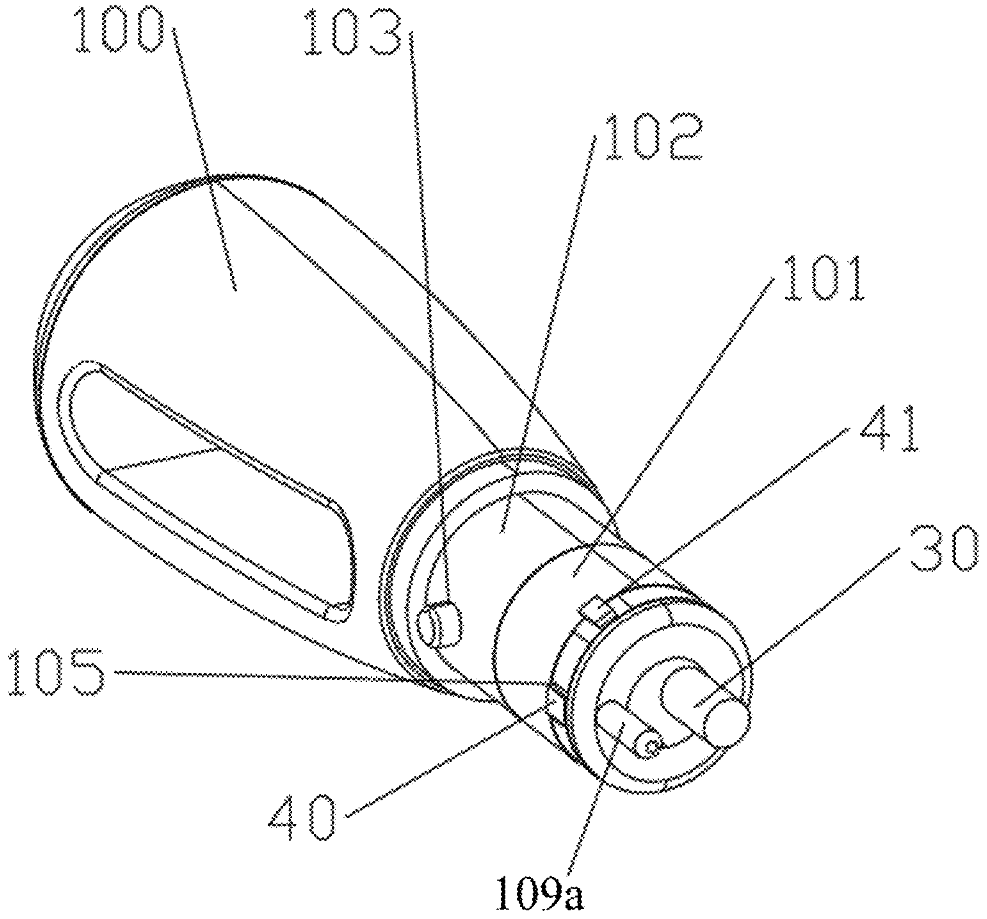
FIG. 11 is a third structural view of the massaging head according to an embodiment of the present disclosure.
Figure 12:
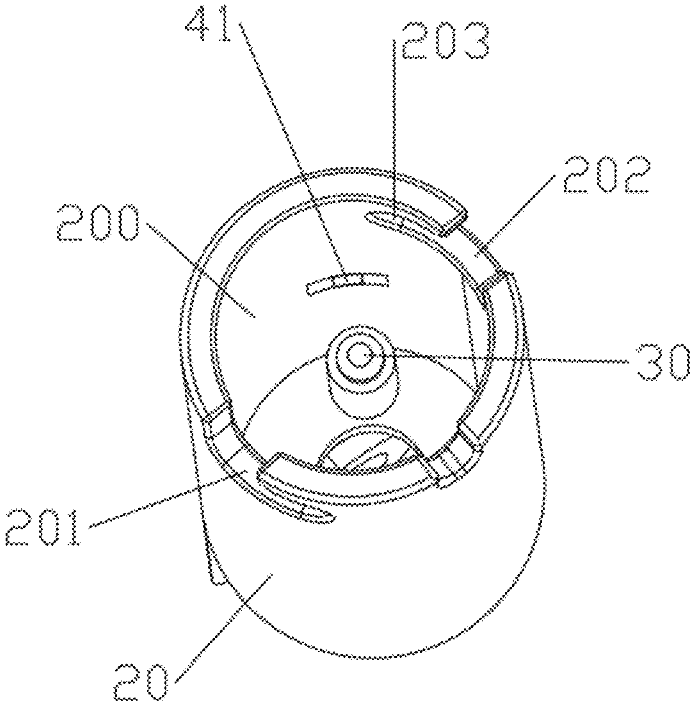
FIG. 12 is a third structural view of the piston according to an embodiment of the present disclosure.
Figure 13:
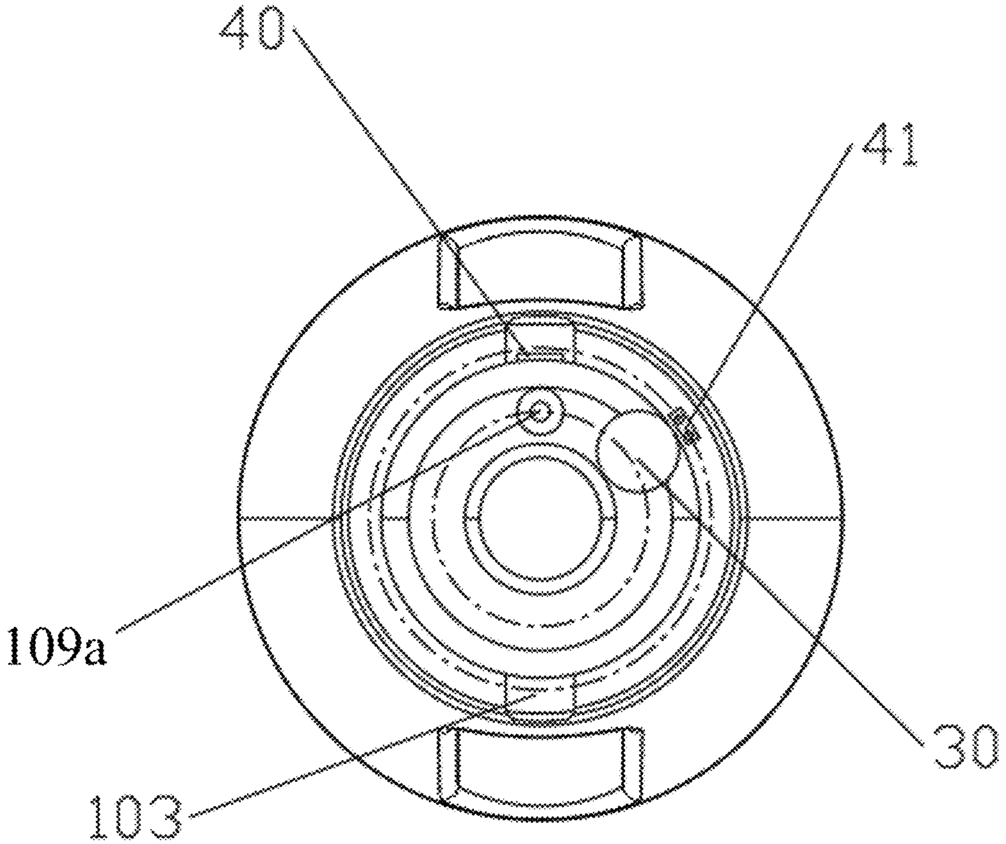
FIG. 13 is a first positional view of a boss, tact switch, magnetic member, and magnetic sensor of the massager according to an embodiment of the present disclosure.
Figure 14:
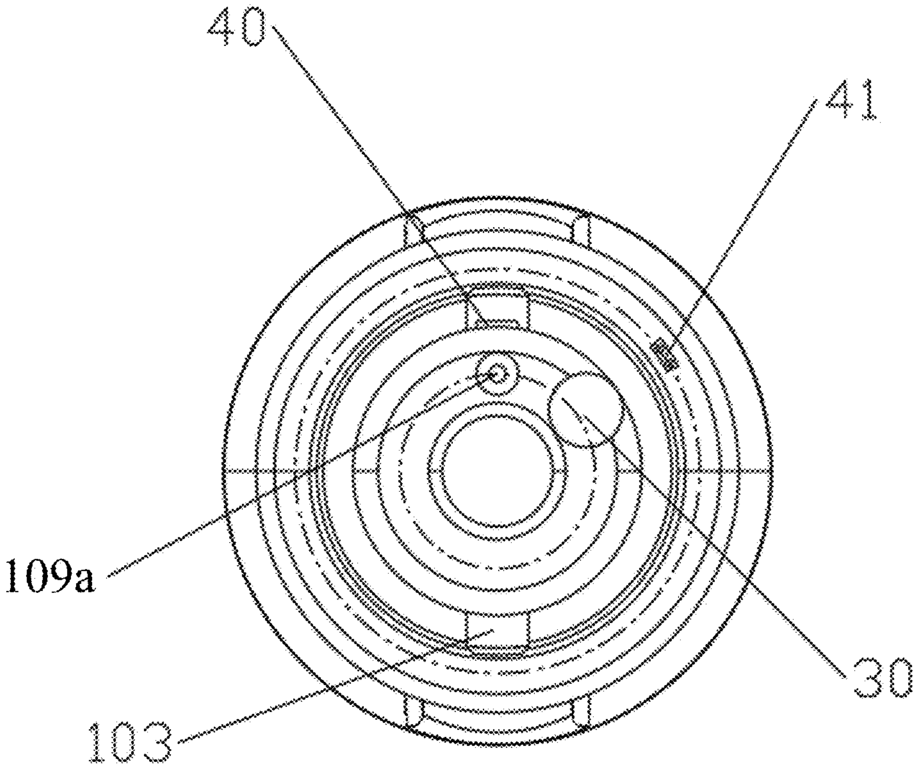
FIG. 14 is a second positional view of the boss, tact switch, magnetic member, and magnetic sensor of the massager according to an embodiment of the present disclosure.
Figure 15:
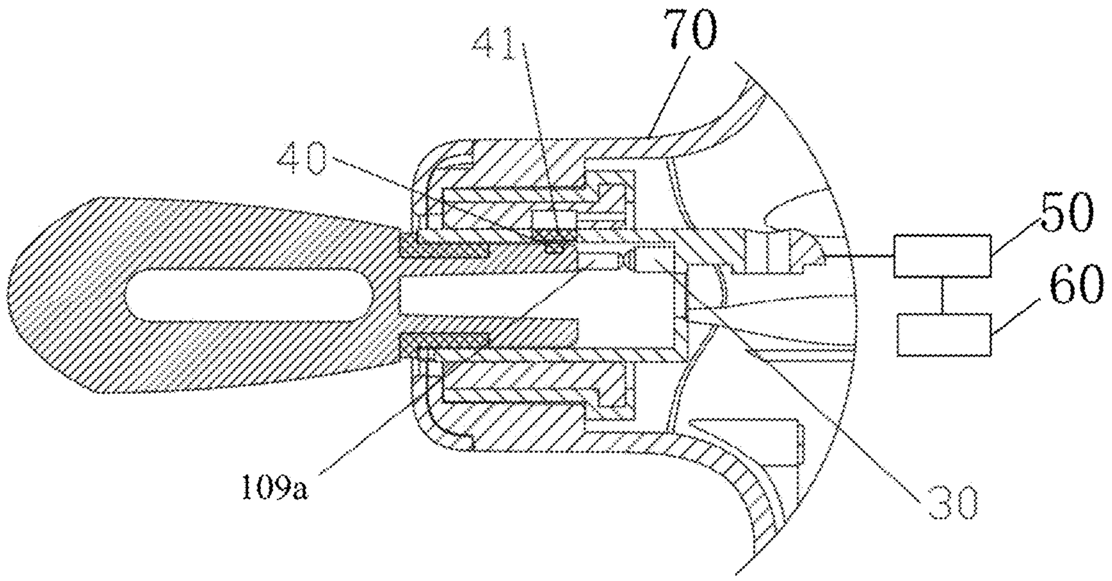
FIG. 15 is a fifth sectional view of the partial structure of the massager according to an embodiment of the present disclosure.

As shown in FIGS. 10-12, in some embodiments, the massaging head connecting assembly is a snap-type massaging head connecting assembly. The snap-type massaging head connecting assembly includes a massaging head 10 and a piston 20.

The massaging head 10 includes a massaging portion 100 and a connecting member 101 connected to the massaging portion 100. At least one positioning pin 103 is circumferentially arranged on the connecting member 101.

The piston 20 defines an accommodating hole 200, and the piston 20 has a rotating snap slot 201 matched with the at least one positioning pin 103. The rotating snap slot 201 has an entry end 202 and a limiting end 203.

When the connecting member 101 is inserted into the accommodating hole 200 and rotated in a first direction, the at least one positioning pin 103 rotates from the entry end 202 to the limiting end 203 to restrain the massaging head 10 from separating from the piston 20.

Compared with the conventional massaging head 10 connecting assemblies, in an embodiment, a pair of positioning pins 103 are arranged on the connecting member 101 of the massaging head 10 and a rotating snap slot 201 is defined in the piston 20 matched with the pair of positioning pins 103. During mounting the massaging head 10 to the piston 20, an end of the connecting member 101 is enabled to correspond to the accommodating hole 200 of the piston 20, and the pair of positioning pins 103 are enabled to correspond to the entry end 202 of the rotating snap slot 201, then the connecting member 101 is inserted into the accommodating hole 200, and the pair of positioning pins 103 are inserted into the entry end 202 of the rotating snap slot 201. Subsequently, by rotating the massaging head 10 in the first direction, the pair of positioning pins 103 are rotated from the entry end 202 to the limiting end 203, thus the massaging head 10 and the piston 20 can be fixed more stably, achieving the purpose of restraining the separation of the massaging head 10 from the piston 20. In this way, the problem that the massaging head 10 of the current massager is prone to fall off during the high-frequency reciprocating motion can be solved.

In particular, the first direction refers to a direction in which the pair of positioning pins 103 are rotated from the entry end 202 of the rotating snap slot 201 to the limiting end 203 of the rotating snap slot 201. A second direction refers to a direction in which the pair of positioning pins 103 are rotated from the limiting end 203 of the rotating snap slot 201 to the entry end 202 of the rotating snap slot 201.

In some embodiments, a silicone snap ring 102 is sleeved at an end of the connecting member 101. Particularly, the silicone snap ring 102 is arranged at an end of the connecting member 101 where the connecting member 101 is connected to the massaging portion 100. The at least one positioning pin 103 is arranged protruding from the silicone snap ring 102.

An end of the silicone snap ring 102 inserted into the piston 20 is in an interference fit with the piston 20.

The silicone snap ring 102 arranged in the above manner can achieve shock absorption between the massaging head 10 and the piston 20 after the insertion of the massaging head 10. In addition, the interference fit can also increase friction between the connecting member 101 and the inner side wall corresponding to the accommodating hole 200, so as to achieving a more stable connection between the massaging head 10 and the piston 20. The anti-falling-off effect of the connection between the connecting member 101 and the piston 20 is achieved on the basis of the cooperation between the at least one positioning pin 103 and the limiting end 203 combined with the interference fit of the silicone snap ring 102, which can significantly reduce the risk of the massaging head 10 separating from the piston 20.

Furthermore, as shown in FIG. 2, in order to prevent the falling-off risk and potential safety hazards caused by the loosening of the massaging head 10 during use, in some embodiments, the massaging head connecting assembly further includes a tact switch 30. The tact switch 30 is arranged at an end portion of the connecting member 101 where the connecting member 101 is inserted into the accommodating hole 200. When the connecting member 101 is tightly connected to the inner side wall corresponding to the accommodating hole 200, the tact switch 30 is triggered.

When the connecting member 101 is tightly threaded to the inner side wall corresponding to the accommodating hole 200, the tact switch 30 can contact an inner bottom wall corresponding to the accommodating hole 200 and be triggered.

The tact switch 30 is arranged at the end portion of the connecting member 101 where the connecting member 101 is inserted into the accommodating hole 200. Only when the connecting member 101 is tightly threaded to the inner side wall corresponding to the accommodating hole 200, the tact switch 30 can contact the inner bottom wall corresponding to the accommodating hole 200. The purpose is that the motor can start to run only after the tact switch 30 abuts against the inner bottom wall corresponding to the accommodating hole 200 to make the tact switch 30 closed. During a running process of the motor, when the tact switch 30 separates from the inner bottom wall corresponding to the accommodating hole 200, the motor stops running. The above manner can be achieved simply by connecting the tact switch 30 to a control circuit of the massager.

Figure 5:
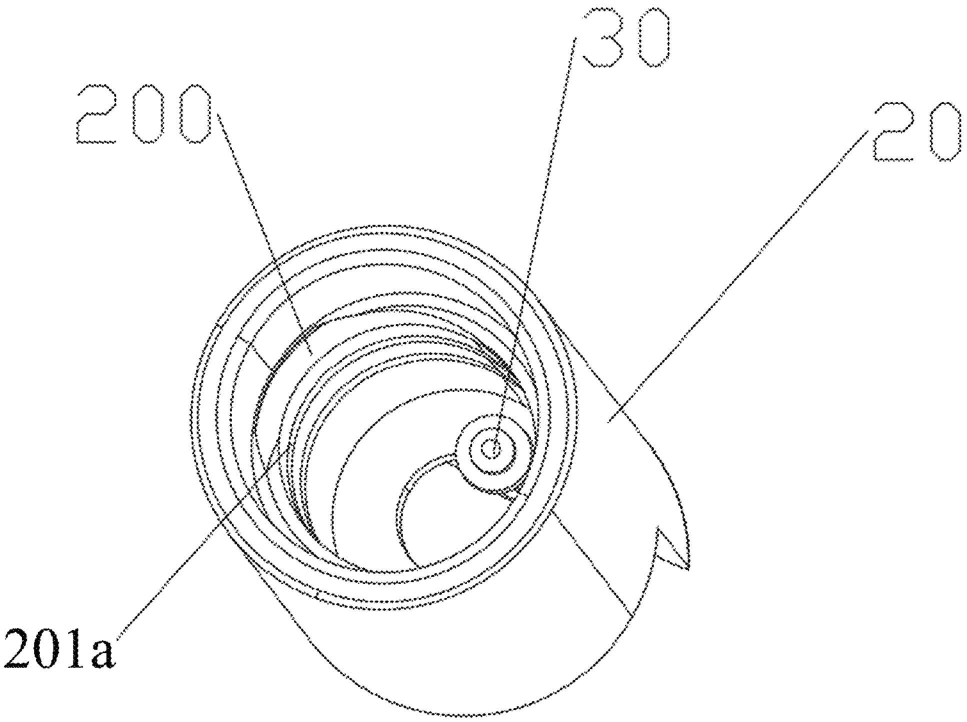
FIG. 5 is a second structural view of the piston according to an embodiment of the present disclosure.
Figure 6:
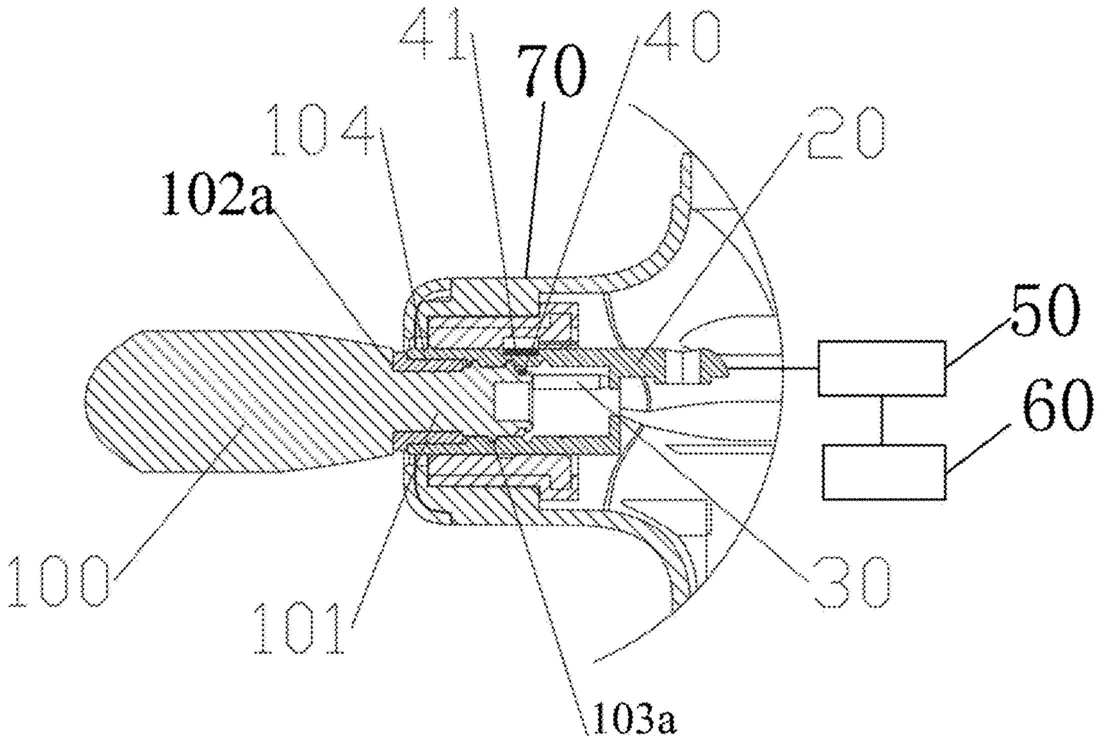
FIG. 6 is a first sectional view of the partial structure of the massager according to an embodiment of the present disclosure.
Figure 7:
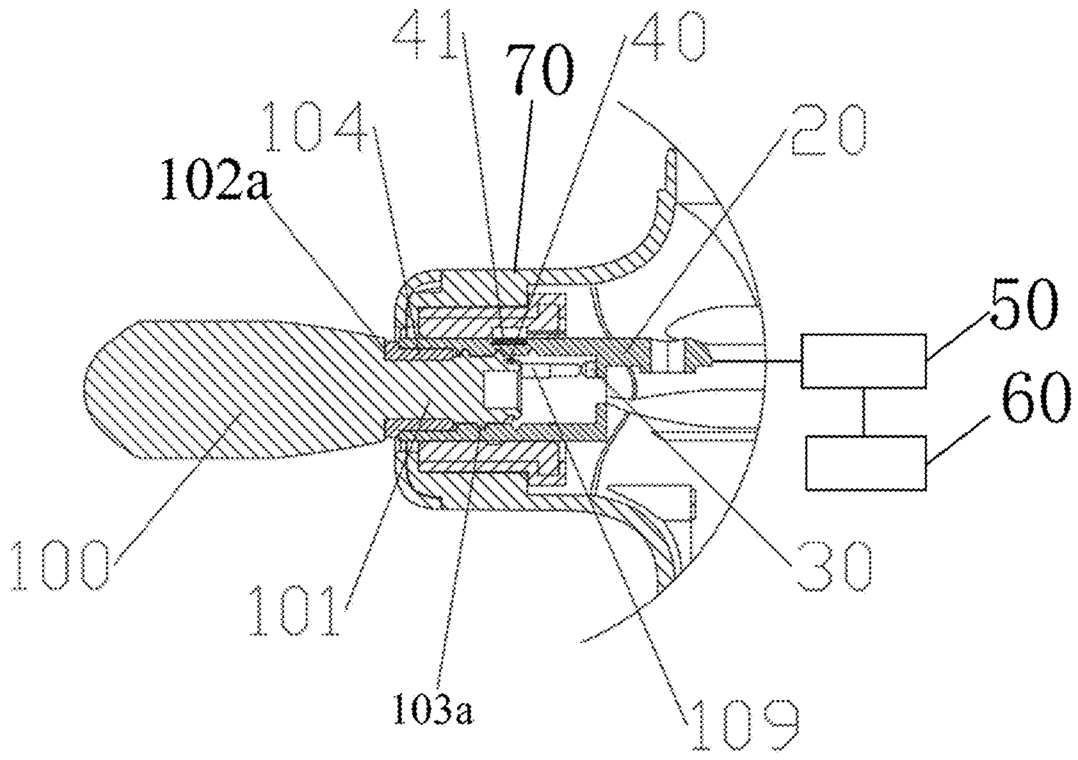
FIG. 7 is a second sectional view of the partial structure of the massager according to an embodiment of the present disclosure.

As shown in FIG. 5, in some embodiments, the tact switch 30 is arranged at the inner bottom wall corresponding to the accommodating hole 200. When the connecting member 101 is tightly connected to the inner bottom wall corresponding to the accommodating hole 200, the tact switch 30 can be triggered by the connecting member 101.

Figure 4:
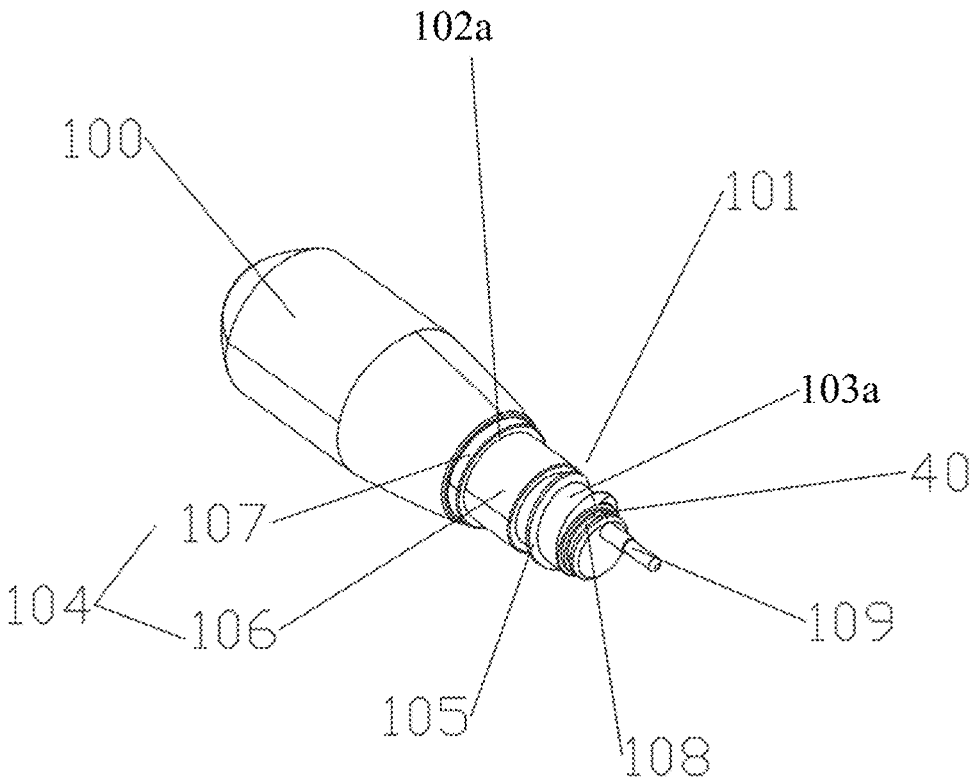
FIG. 4 is a second structural view of the massaging head according to an embodiment of the present disclosure.

In some embodiments, referring to FIGS. 4-5, a boss 109 matched with the tact switch 30 is arranged on the end portion of the connecting member 101 where the connecting member 101 is inserted into the accommodating hole 200.

The tact switch 30 is arranged on the inner bottom wall of the piston 20. When the connecting member 101 is tightly threaded to the inner bottom wall corresponding to the accommodating hole 200, the boss 109 on the connecting member 101 can contact the tact switch 30. The purpose is that the motor can start to run only after the boss 109 contacts the tact switch 30 to make the tact switch 30 closed. During the running process of the motor, when the boss 109 separates from the tact switch 30, the motor stops running. The above manner can be achieved simply by connecting the tact switch 30 to the control circuit in the massager.

When the connecting member 101 is tightly threaded to the inner bottom wall corresponding to the accommodating hole 200, the boss 109 can contact the tact switch 30.

In some embodiments, referring to FIGS. 11-12, the boss **109*a* is arranged on the end portion of the connecting member 101 inserted into the accommodating hole 200. The boss 109*a* is eccentrically arranged with respect to an axis of the connecting member 101. The tact switch 30 is arranged on the piston 20. When the at least one positioning pin 103 rotates from the entry end 202 of the rotating snap slot 201 to the limiting end 203 of the rotating snap slot 201, the boss 109*a* contacts the tact switch 30**.

That is, a position where the boss **109*a* contacts the tact switch 30 exactly corresponds to a position where the at least one positioning pin 103 rotates to the limiting end 203. Only when a triggered state of the tact switch 30 corresponds to a limiting state of the connecting member 101, a driving mechanism 50 (i.e. the motor) in the massager can start to run, avoiding an insertion of the massaging head 10 when the piston 20 is in reciprocating motion. Understandably, when the massaging head 10 rotates relative to the piston 20 such that the tact switch 30 is not triggered, the driving mechanism 50** stops running.

Specifically, the tact switch 30 is arranged on the inner bottom wall of the piston 20 and is mated with the limiting end 203 of the rotating snap slot 201. That is, a position of the tact switch 30 is mated with a position of the rotating snap slot 201. Only when the at least one positioning pin 103 rotates from the entry end 202 of the rotating snap slot 201 to the limiting end 203, an end of the boss **109*a* can contact the tact switch 30. The purpose is that the motor can start to run only after the boss 109*a* contacts the tact switch 30 to make the tact switch 30 closed. During the running process of the motor, when the boss 109*a* separates from the tact switch 30, the motor stops running. This manner can be achieved simply by connecting the tact switch 30** to the control circuit in the massager.

It should be noted that the tact switch 30 in the above embodiments can be a tact switch 30 in the related art that can realize the functions of the present disclosure.

As shown in FIGS. 2, 6-7, 12-13, and 15, in order to prevent the falling-off risk and potential safety hazards caused by the loosening of the massaging head 10 during use, in some embodiments, a magnetic member 40 is arranged at the end of the connecting member 101 inserted into the accommodating hole 200, and a magnetic sensor 41 is arranged on an inner side wall of the piston 20. The magnetic sensor 41 is configured to detect a magnetic field intensity of the magnetic member 40.

The magnetic sensor 41 detecting the magnetic field intensity of the magnetic member 40 refers to the magnetic sensor 41 detecting a position where the connecting member 101 is in the accommodating hole 200. Generally, when the connecting member 101 is tightened with the piston 20, a signal obtained by the magnetic sensor 41 detecting the magnetic member 40 is a first reference signal. When a real-time detection signal changes relative to the first reference signal, there may be a risk that the connecting member 101 is falling off from the piston 20.

Therefore, by means of the magnetic sensor 41 detecting the magnetic field intensity of the magnetic member 40, a displacement change of the connecting member 101 relative to the accommodating hole 200 can be detected. Only when the first reference signal is satisfied, the driving mechanism 50 in the massager body can be activated. When there is a displacement change during the running process of the driving mechanism 50 and the obtained signal deviates from the first reference signal, the driving mechanism 50 is immediately controlled to stop running.

In addition to detecting the displacement change through detecting the magnetic field intensity of the magnetic member 40 by the magnetic sensor 41 as mentioned above, a rotation angle of the connecting member 101 relative to the piston 20 can also be detected. For this purpose, the magnetic member 40 can be eccentrically arranged with respect to the axis of the connecting member 101, and the magnetic sensor 41 can be configured to detect the magnetic field intensity and a magnetic field direction of the magnetic member 40.

In a case where the magnetic member 40 is eccentrically arranged with respect to the axis of the connecting member 101, when the magnetic member 40 rotates under a drive of the connecting member 101, a displacement variation and an angle variation may occur, and the magnetic sensor 41 may obtain a corresponding displacement variation signal and angle variation signal.

In a case of detecting the angle variation signal, when the connecting member 101 is tightened with the piston 20, an angle signal obtained by the magnetic sensor 41 detecting the magnetic member 40 can be used as a second reference signal, and an angle signal that varies relative to the second reference signal is an angle variation signal.

It should be noted that when the angle variation signal is detected, the driving mechanism 50 can be controlled to stop running, thereby adding double insurance and improving safety. In other words, only one of the displacement variation signal and the angle variation signal needs to be detected to control the operation of the driving mechanism, improving safety protection.

Moreover, before an activation of the driving mechanism 50, when the detection signal of the magnetic member 40 detected by the magnetic sensor 41 falls within a predetermined range, the driving mechanism 50 can be activated. During the running process of the driving mechanism 50, once an angle change of the connecting member 101 is detected, the driving mechanism 50 is stopped. In other words, the connecting member 101 can be inserted into the accommodating hole 200 or rotated relative to the accommodating hole 200 only when the driving mechanism 50 is in a stopped state.

In the above-mentioned embodiments, the magnetic member 40 may be a magnetized part of the connecting member 101, or the magnetic member 40 may also be a magnet. In particular, the connecting member 101 may be made of a magnetizable material such as neodymium, iron, boron, etc., or a portion made of the magnetizable material may be embedded in the connecting member 101 and this part is magnetized, or a finished magnet may be directly embedded in the connecting member 101.

In a case where the magnetic member 40 is a magnet, in some embodiments, an induction slot 108 for mounting the magnetic member 40 is defined in the connecting member 101, and the magnet is embedded and fixed in the induction slot 108.

The magnetic sensor 41 can be a magnetic sensor in the related art.

In an embodiment, the magnetic sensor 41 is connected to a controller 60 of the massager. The magnetic sensor 41 is capable of detecting the magnetic field direction or the magnetic field intensity of the magnetic member 40 and generating corresponding signals to be sent to the controller 60. In a case of detecting the magnetic field direction, when it is detected that the angle change between the connecting member 101 and the piston 20 exceeds a predetermined angle range, and in a case of detecting the magnetic field intensity, when it is detected that the displacement range between the connecting member 101 and the piston 20 exceeds a predetermined displacement range, the controller 60 controls the operation of the motor.

For example, for the threaded massaging head connecting assembly in the above-mentioned embodiments, the external threads 105 on the connecting member 101 are in the threaded fit with the internal threads 201 on the inner side wall corresponding to the accommodating hole 200. When the massaging head 10 is secured to the piston 20, each of a relative rotating angle and a relative displacement between the massaging head 10 and the piston 20 are falls within a corresponding predetermined range. Thus, when each of the relative rotating angle corresponding to the magnetic field direction or the relative displacement corresponding to the magnetic field intensity of the magnetic member 40 detected by the magnetic sensor 41 is in the corresponding predetermined range, the motor in the massager can be controlled by the controller 60 to start. In an activation state of the motor, when at least one of the relative rotating angle corresponding to the magnetic field direction and the relative displacement corresponding to the magnetic field intensity of the magnetic member 40 changes and exceeds the corresponding predetermined range, the motor in the massager is controlled by the controller 60 to stop running.

For the snap-type massaging head connecting assembly in the above-mentioned embodiments, when the massaging head 10 is correctly mounted, i.e., when the at least one positioning pin 103 is correctly snapped into the limiting end 203 of the rotating snap slot 201, signals obtained by the magnetic sensor 41 detecting the current position of the magnetic member 40 regard as the reference signals. Due to the reciprocating motion of the massaging head 10, a signal value of the displacement change is a range value, and a signal value of the angle change may also be a range value (such as an angle range corresponding to the at least one positioning pin 103 completely separating from the limiting end 203). These range values can be predetermined as the signal value ranges when the massaging head 10 is correctly mounted and can serve as detection standard value ranges. When the massaging head 10 has a displacement change relative to the piston 20 and the position of the magnetic member 40 deviates from a predetermined position range, it indicates that the massaging head 10 is not mounted in place or the massaging head 10 has a risk of falling off, and the driving mechanism 50 is in a stopped state. Therefore, when the signal transmitted by the magnetic sensor 41 is not in a corresponding predetermined signal value range, the controller 60 in the massager controls the motor to stop running.

In addition, since the magnetic sensor 41 can detect the magnetic field direction of the magnetic member 40, when the motor is controlled by the controller 60 to activate, the magnetic field direction detected corresponds to the predetermined angle. During the running process of the motor, when an angle change is detected, the controller 60 controls the motor to stop running.

In this manner, whether the massaging head 10 is mounted in place relative to the piston 20 or whether the massaging head 10 falls off can be monitored. Only when the massaging head 10 and the piston 20 being correctly mounted is detected, the motor can operate, thus protecting the user, especially avoiding the dangerous behavior of the user while mounting or removing the massaging head 10 during the running process of the motor, thereby improving the operation safety.

As shown in FIGS. 8-9, 14, and 16, in order to prevent the falling-off risk and potential safety hazards caused by the loosening of the massaging head 10 during use, in some embodiments, the magnetic member 40 is arranged at the end of the connecting member 101 inserted into the accommodating hole 200. The magnetic member 40 is eccentrically arranged with respect to the axis of the connecting member 101. A magnetic sensor 41 is arranged on a side wall of the massager body. The magnetic sensor 41 is configured to detect the magnetic field direction or the magnetic field intensity of the magnetic member 40.

Figure 8:
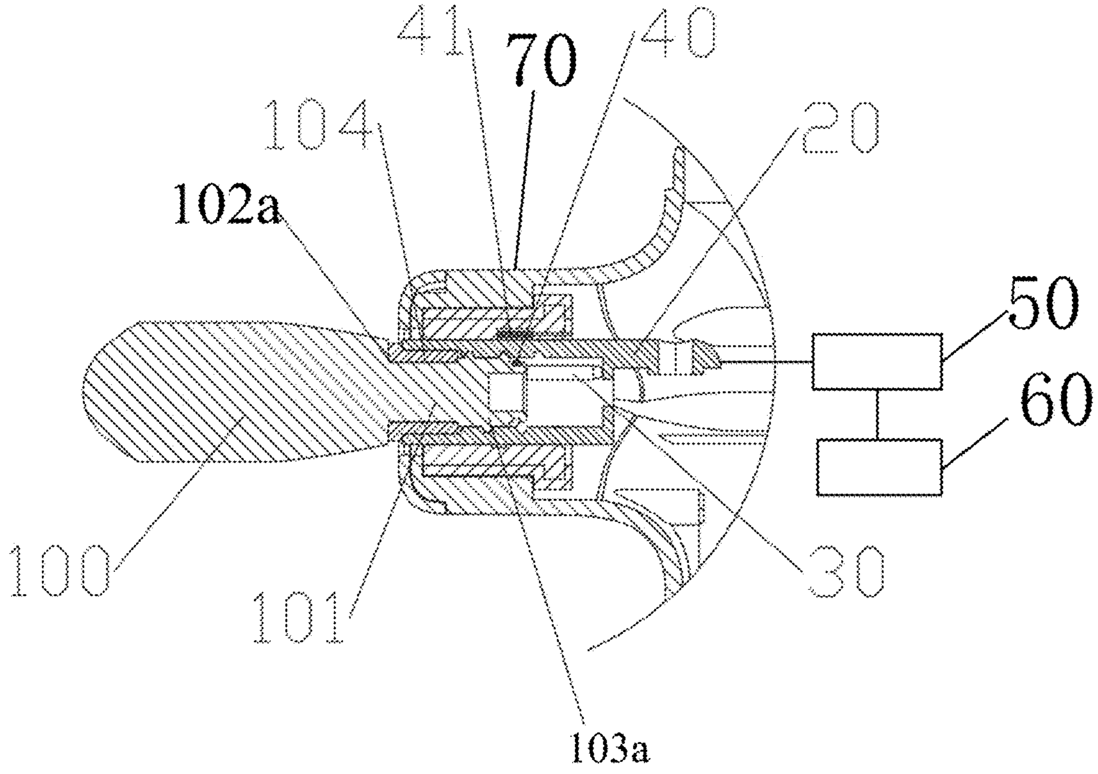
FIG. 8 is a third sectional view of the partial structure of the massager according to an embodiment of the present disclosure.
Figure 9:
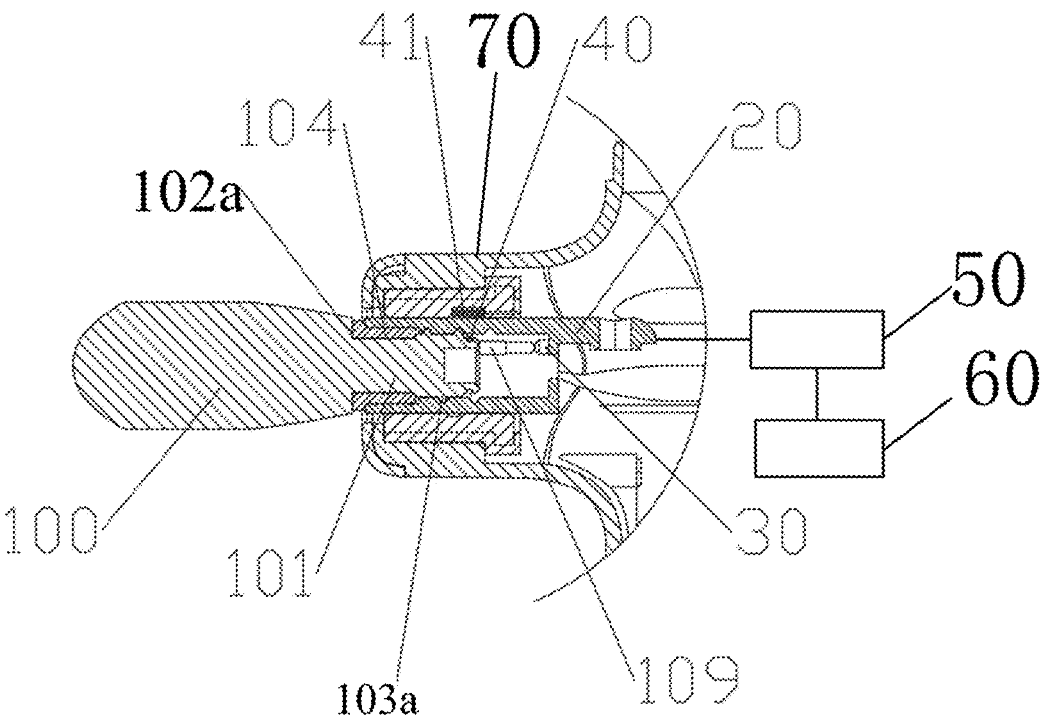
FIG. 9 is a fourth sectional view of the partial structure of the massager according to an embodiment of the present disclosure.
Figure 16:
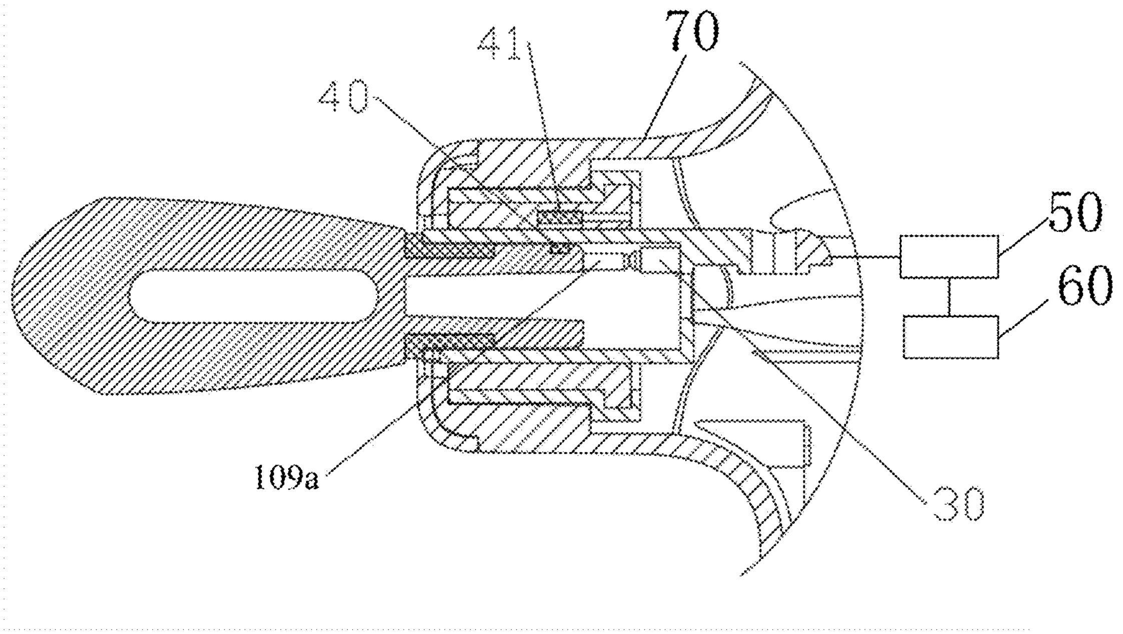
FIG. 16 is a sixth sectional view of the partial structure of the massager according to an embodiment of the present disclosure.
Figure 17:
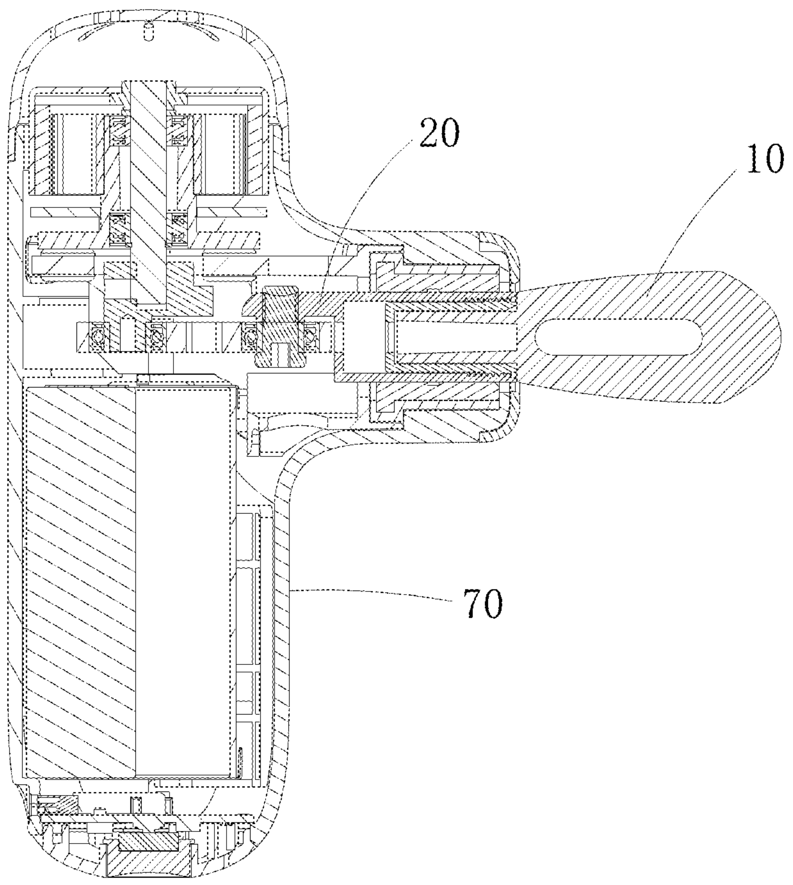
FIG. 17 is a first schematic view of an overall structure of the massager according to an embodiment of the present disclosure.
Figure 18:
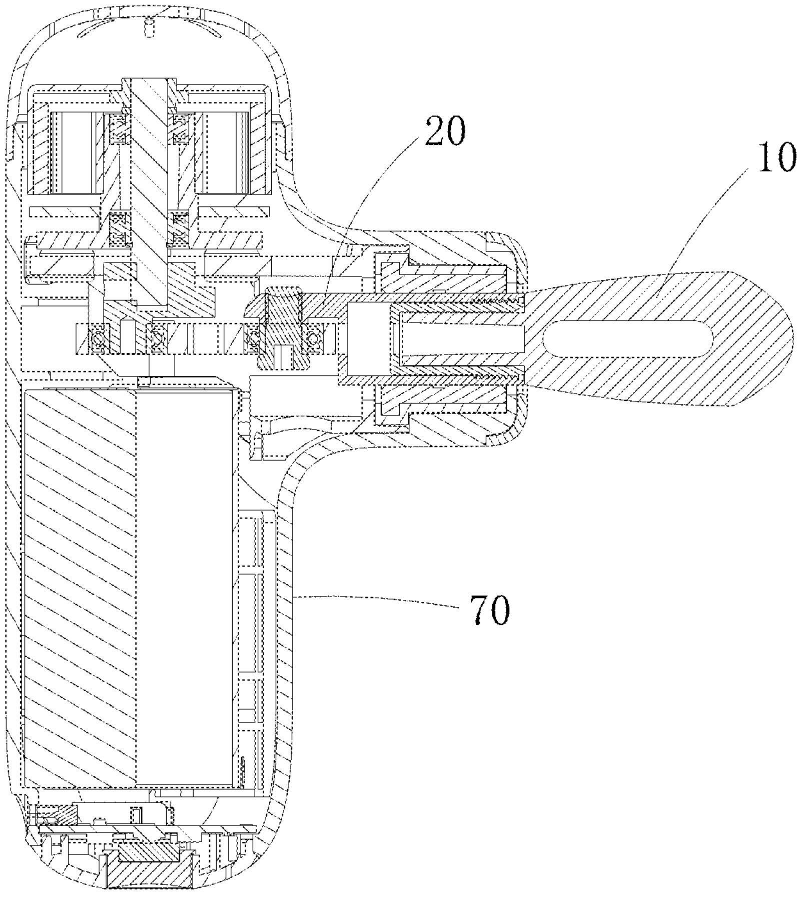
FIG. 18 is a first schematic view of the overall structure of the massager according to an embodiment of the present disclosure.

As shown in FIGS. 8-9 and 16, along an outward-extending direction from the piston 20 to the massager body, a position of the magnetic sensor 41 on the side wall of the massager body corresponds to the position of the magnetic sensor 41 on the side wall of the piston 20.

It should be noted that in the above-mentioned embodiments, the magnetic sensor 41 may be mounted on the massager body or on the piston 20, as long as it can detect the changes in magnetic field intensity and magnetic field direction in cooperation with the magnetic member 40.

As shown in FIGS. 6-9 and 15-18, a massager includes a massager body and a driving mechanism 50 arranged inside the massager body. The massager further includes the massaging head connecting assembly in any of the above-mentioned embodiments. The piston 20 is connected to the driving mechanism 50, and the massaging head 10 is connected to the piston 20.

In particular, the massager body includes a housing 70. The piston 20 is connected to the driving mechanism 50 and is driven by the driving mechanism 50 to achieve the reciprocating motion. As the massaging head 10 is connected to the piston 20, the massaging head 10 can also be driven to reciprocate, thereby achieving massaging and striking on the user. Moreover, during the running process of the driving mechanism 50, the massaging head 10 cannot be removed from the piston 20, and when the massaging head 10 is not properly mounted on the piston 20, the driving mechanism 50 can not start either, which ensures the safety of the user.

The massager described in this embodiment can solve the problem that the massaging head 10 of the massager is currently prone to fall off during the high-frequency reciprocating motion.

In addition, for the massager of which the massaging head connecting assembly includes the tact switch 30 and/or the cooperation of the magnetic member 40 and a magnetic sensor 41, whether the massaging head 10 is properly installed relative to the piston 20 can further be detected, avoiding a risk of damage caused by the installation or removal of the massaging head 10, and providing protection to the user.

Working principle of the present disclosure is described as follows.

Regarding the above-mentioned threaded massaging head connecting assembly, compared with the conventional massaging head connecting assemblies, the external threads 105 are arranged on the connecting member 101, the internal threads 201 are arranged on the inner side wall corresponding to the accommodating hole 200, and the external threads 105 and the internal threads 201 are mated with each other and form a thread connection, thus the fixation of the massaging head 10 and the piston 20 is achieved. In this way, when connecting the massaging head 10 with the piston 20, the massaging head 10 needs to be rotated, and the massaging head 10 can be secured to the piston 20 via the thread connection.

Furthermore, in order to address the potential loosening issue that may arise from the thread connection during the high-frequency vibration, the silicone fixing ring 104 is arranged to increase the friction between the connecting member 101 and the inner side wall corresponding to the accommodating hole 200 when the connecting member 101 is connected to the inner side wall corresponding to the accommodating hole 200. Once the connecting member 101 and the inner side wall corresponding to the accommodating hole 200 are threaded together, the end of the piston 20 presses against the limiting ring 107 of the silicone fixing ring 104, thus achieving vibration reduction. Additionally, the damping connection between the inserting segment 106 of the silicone fixing ring 104 and the inner side wall corresponding to the accommodating hole 200 serves to secure the thread connection, thereby preventing the thread connection from loosening during the high-frequency reciprocating motion.

Regarding the above-mentioned snap-type massaging head connecting assembly, compared with the conventional massaging head 10 connecting assemblies, at least one positioning pin 103 is arranged on the connecting member 101 of the massaging head 10 and a rotating snap slot 201 matched with the at least one positioning pin 103 is defined in the piston 20. During mounting the massaging head 10 to the piston 20, an end of the connecting member 101 is enabled to correspond to the accommodating hole 200 of the piston 20, and the at least one positioning pin 103 is enabled to correspond to the entry end 202 of the rotating snap slot 201, then the connecting member 101 is inserted into the accommodating hole 200, and the at least one positioning pin 103 is inserted into the entry end 202 of the rotating snap slot 201. Subsequently, by rotating the massaging head 10 in the first direction, the at least one positioning pin 103 is rotated from the entry end 202 to the limiting end 203, thus the massaging head 10 and the piston 20 can be fixed more stably, achieving the purpose of restraining the massaging head 10 from separating from the piston 20.

The above-mentioned embodiments only express specific implementation modes of the present disclosure. Although the description is relatively specific and detailed, it should not be understood as a limitation on the patent scope of the present disclosure. It should be noted that for ordinary skilled in the art, without departing from the concept of the present disclosure, several deformations and improvements can still be made, and these all belong to the protection scope of the present disclosure.

What is claimed is:

1. A massager, comprising:

a housing; a piston, at least partially located in the housing and defining an accommodating hole;

a driving mechanism, connected to the piston and configured to cause the piston to reciprocate; and a connecting module, comprising a connecting member and a massaging head connected to the connecting member, wherein the connecting member is arranged to be inserted into the accommodating hole, and the connecting member is configured to restrain the massaging head from separating from the piston while the piston reciprocates at a speed higher than a predetermined speed;

wherein the connecting member is arranged with an annular elastic member and a screwing portion; the annular elastic member and the screwing portion sleeve a periphery of the connecting member; an end of the annular elastic member is arranged to be connected to the massaging head; a second end of the annular elastic member disposed away from the massaging head is arranged to be connected to an end of the screwing portion; and the screwing portion is arranged to extend away from the annular elastic member and away from the massaging head; the annular elastic member is arranged to be in damping connection with an accommodating hole wall of the piston; the screwing portion is screwedly connected to the accommodating hole wall of the piston;

wherein the piston is arranged with a second connecting member matched with the annular elastic member and the screwing portion arranged on the connecting member;

wherein the massager further comprises a sensing module and a massager body, the massager body is arranged at an exterior of the connecting member, the sensing module comprises a magnetic member and a magnetic sensor, the magnetic member is located at an end portion of the connecting member inserted into the accommodating hole, and the magnetic sensor is located on a side wall of the massager body or a side wall of the piston; and the magnetic member is eccentrically arranged relative to an axis of the connecting member; and the magnetic sensor is configured to detect a relative position between the connecting member and the accommodating hole; the driving mechanism is configured to be activated to drive the piston to reciprocate only when the connecting member is tightened with the accommodating hole; and when the magnetic sensor detects a displacement between the connecting member and the accommodating hole during operation of the driving mechanism, the driving mechanism is configured to be immediately controlled to stop operating.

2. The massager as claimed in claim 1, wherein the predetermined speed corresponds to a stopped state of the piston.

3. The massager as claimed in claim 1, further comprising a controller, wherein the controller is connected with the driving mechanism and configured to activate or shut down the driving mechanism.

4. The massager as claimed in claim 1, wherein:

the annular elastic member is a silicone fixing ring, an end of the connecting member proximate to the massaging head defines an annular fixing slot, and the silicone fixing ring is arranged in the annular fixing slot; and the silicone fixing ring comprises an inserting segment and a limiting ring, when the annular elastic member and the screwing portion are mated with the second connecting member, an end of the piston is configured to abut against the limiting ring, and the inserting segment is arranged in damping connection with an inner side wall corresponding to the accommodating hole.

5. The massager as claimed in claim 1, wherein:

the annular elastic member is a silicone snap ring arranged at an end of the connecting member connected with the massaging head; and when the connecting member is mated with the second connecting member, an end of the silicone snap ring inserted into the accommodating hole is in interference fit with the piston.

6. The massager according to claim 1, wherein the massager further comprises a second sensor disposed on the connecting member or the piston, wherein when the annular elastic member and the screwing portion are mated with the second connecting member, the second sensor is triggered; wherein the second sensor is a tact switch disposed at an end portion of the connecting member inserted into the accommodating hole, and when the annular elastic member and the screwing portion are mated with the second connecting member, the tact switch is triggered; or the sensor is a tact switch is disposed at an inner bottom wall corresponding to the accommodating hole, and when the annular elastic member and the screwing portion are mated with the second connecting member, the tact switch is triggered.

7. The massager as claimed in claim 6, wherein:

the end portion of the connecting member inserted into the accommodating hole is arranged with a boss, and the boss is eccentrically arranged relative to the axis of the connecting member; and the tact switch is located at the inner bottom wall corresponding to the accommodating hole, and when the annular elastic member and the screwing portion are mated with the second connecting member, the boss is in contact with the tact switch.

8. The massager as claimed in claim 1, wherein the connecting member defines an induction slot, and the magnetic member is located in the induction slot.

9. The massager as claimed in claim 1, wherein the magnetic member is a magnet or a magnetized portion of the connecting member.

10. A massager, comprising:

a housing;

a piston, at least partially located in the housing and defining an accommodating hole;

a driving mechanism, connected to the piston and configured to cause the piston to reciprocate; and a connecting module, comprising a connecting member and a massaging head connected to the connecting member, wherein the connecting member is arranged to be inserted into the accommodating hole, and the connecting member is configured to restrain the massaging head from separating from the piston while the piston reciprocates at a speed higher than a predetermined speed;

wherein the connecting member is arranged with an annular elastic member and a positioning protrusion, the annular elastic member sleeves a periphery of the connecting member; an end of the annular elastic member is connected to the massaging head; the annular elastic member is arranged to be in damping connection with an accommodating hole wall of the piston;

wherein the massager further comprises a sensing module and a massager body, the massager body is arranged at an exterior of the connecting member, the sensing module comprises a magnetic member and a magnetic sensor, the magnetic member is located at an end portion of the connecting member inserted into the accommodating hole, and the magnetic sensor is located on a side wall of the massager body or a side wall of the piston;

the magnetic member is eccentrically arranged relative to an axis of the connecting member; and the magnetic sensor is configured to detect a relative position between the connecting member and the accommodating hole; the driving mechanism is configured to be activated to drive the piston to reciprocate only when the connecting member is tightened with the accommodating hole; and when the magnetic sensor detects a displacement between the connecting member and the accommodating hole during operation of the driving mechanism, the driving mechanism is configured to be immediately controlled to stop operating.

11. The massager according to claim 10, further comprising:

the driving mechanism, located in the housing, connected to the piston, and configured to cause the piston to reciprocate in an activation state; and a controller, connected to the driving mechanism and configured to activate the driving mechanism when the connecting member is inserted into the accommodating hole and connected to the piston, and to shut down the driving mechanism when the connecting member moves out of the accommodating hole and separates from the piston.

12. The massager according to claim 10, wherein:

the positioning protrusion is a positioning pin arranged on the annular elastic member in a circumferential direction of the annular elastic member, the positioning hole of the piston is a rotating snap slot and matched with the positioning pin, and the rotating snap slot comprises an entry end and a limiting end; and wherein while the connecting member is arranged to be inserted into the accommodating hole and rotate in a first direction, the positioning pin rotates from the entry end to the limiting end to restrain the massaging head from separating from the piston.

* * * * *